BEST AVAILABLE COPY
F. TERSTEGEN.
REPEATING MECHANISM FOR WATCHES OR OTHER TIME PIECES.
No. 11,151. Reissued Mar. 10, 1891.
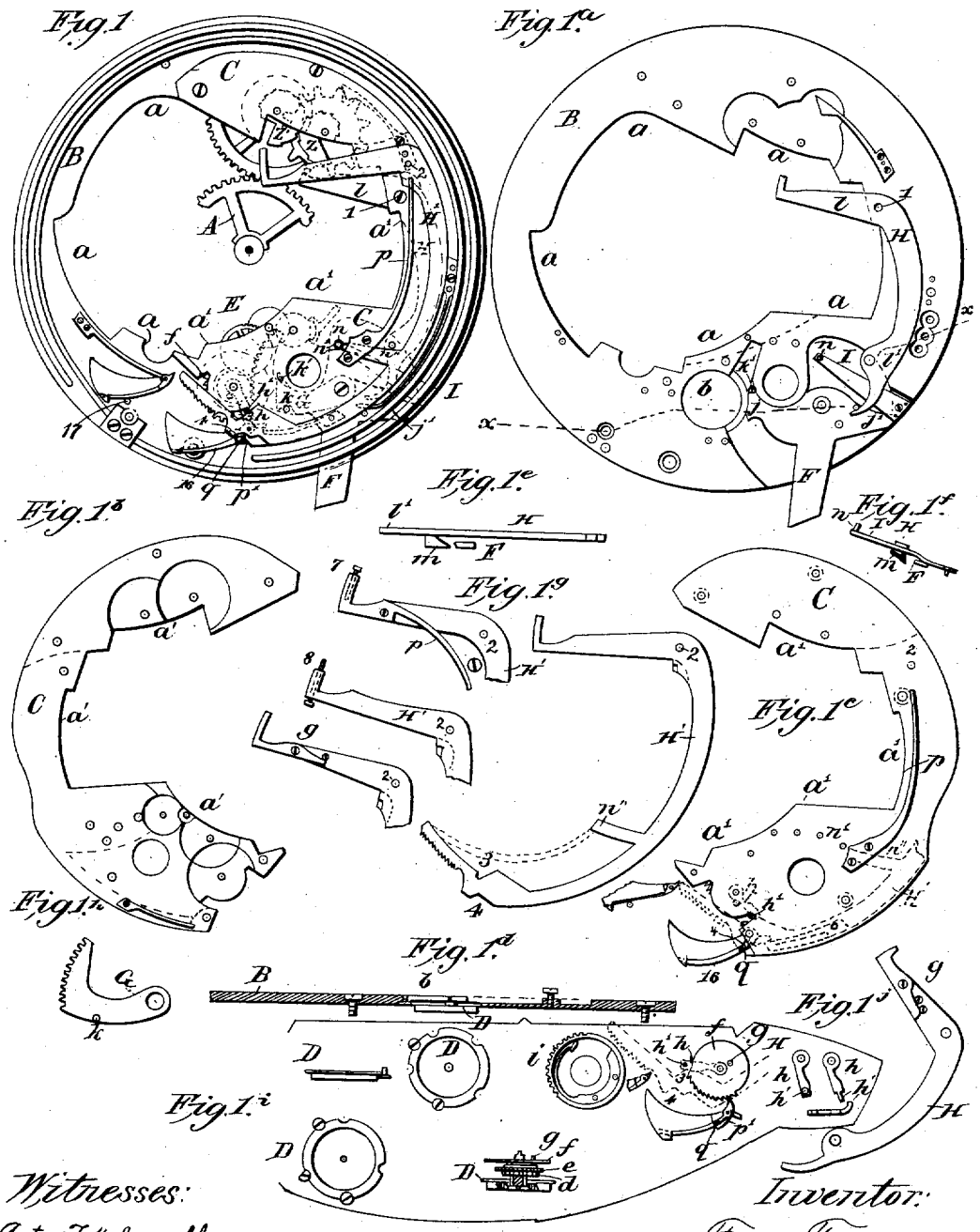
Witnesses:
Anton T. Habermehl
Louis J. Lewkowitz
Inventor:
Fred Terstegen
By Wilton Lee Downs
His Atty
THE NORRIS PETERS CO., PHOTO-LITHO., WASHINGTON, D. C.

3 Sheets—Sheet 2.
F. TERSTEGEN.
REPEATING MECHANISM FOR WATCHES OR OTHER TIME PIECES.
No. 11,151. Reissued Mar. 10, 1891.
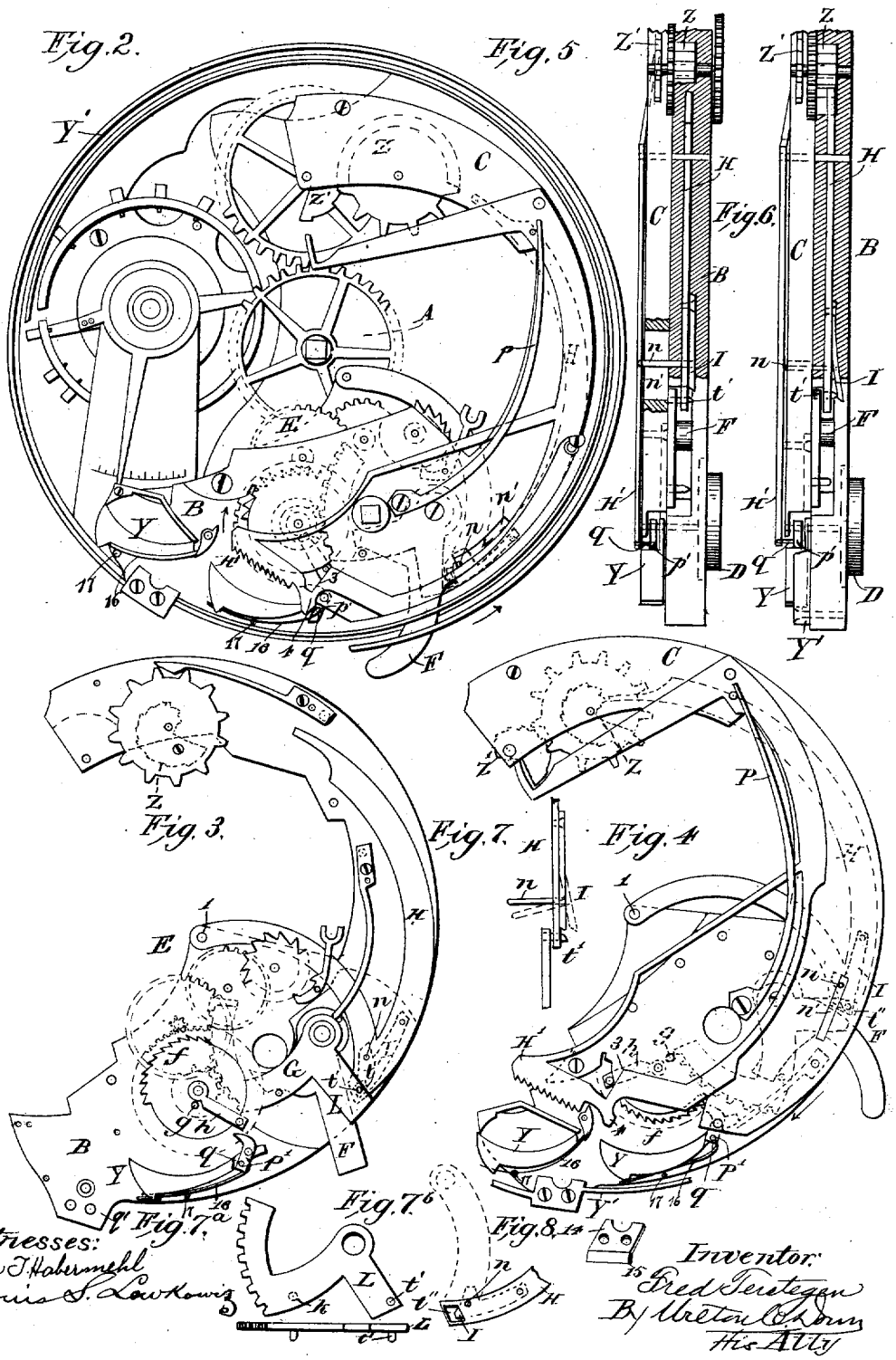
Witnesses:
Anton J. Habermehl
Louis S. Lawkowitz
Inventor:
Fred Terstegen
By Victor J. Evans
His Atty
THE NORRIS PETERS CO., PHOTO-LITHO., WASHINGTON, D. C.

3 Sheets—Sheet 3.
F. TERSTEGEN.
REPEATING MECHANISM FOR WATCHES OR OTHER TIME PIECES.
No. 11,151. Reissued Mar. 10, 1891.
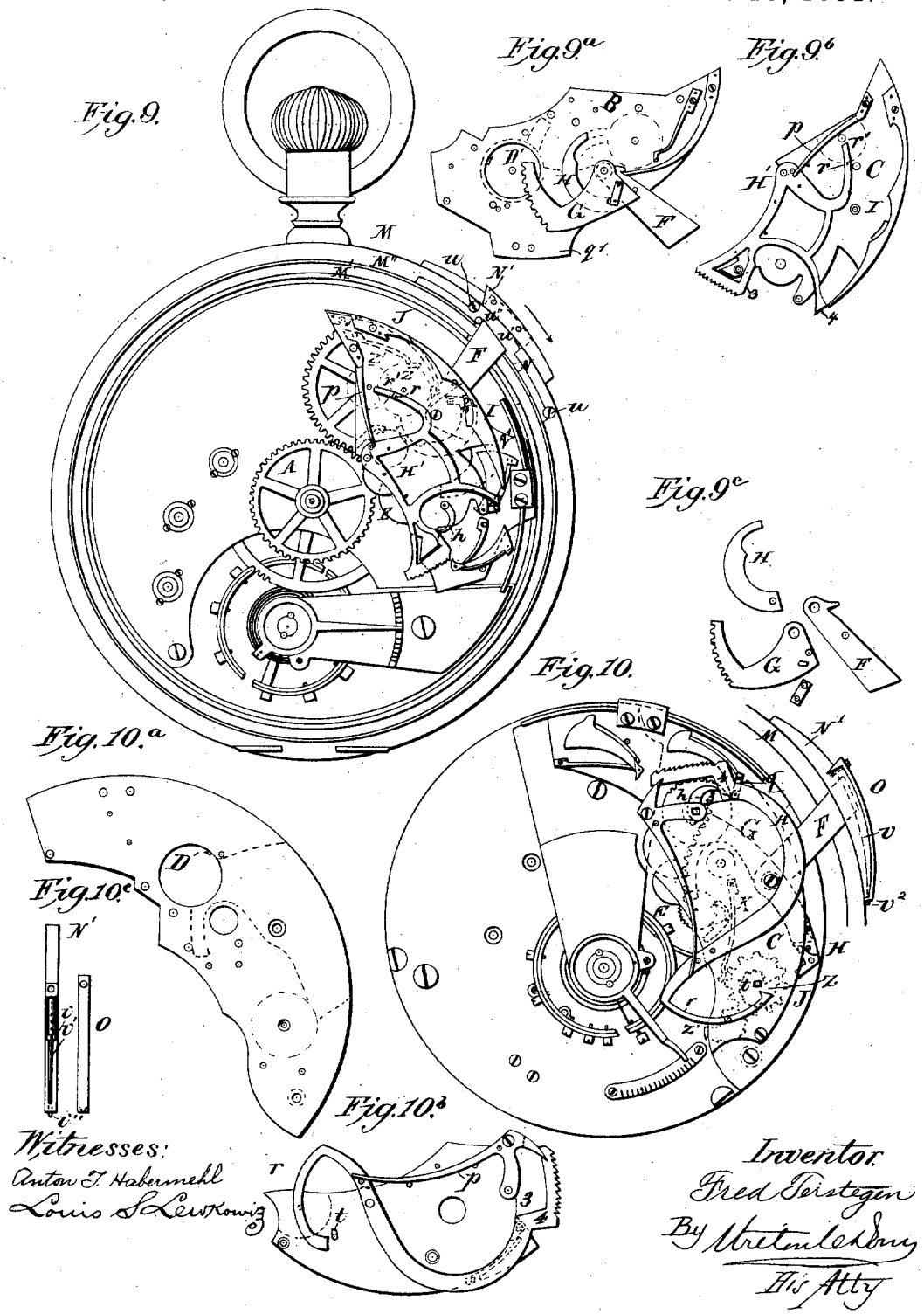
Witnesses:
Anton T. Habermehl
Louis S. Lewkowitz
Inventor.
Fred Terstegen
By Uretzel & Long
His Atty
THE NORRIS PETERS CO., PHOTO-LITHO., WASHINGTON, D. C.

UNITED STATES PATENT OFFICE.

FRED TERSTEGEN, OF ELIZABETH, NEW JERSEY.

REPEATING MECHANISM FOR WATCHES OR OTHER TIME-PIECES.

SPECIFICATION forming part of Reissued Letters Patent No. 11,151, dated March 10, 1891.

Original No. 421,844, dated February 18, 1890. Application for reissue filed August 30, 1890. Serial No. 363,564.

*To all whom it may concern:*

Be it known that I, FRED TERSTEGEN, a citizen of the United States, residing at Elizabeth, in the county of Union and State of New Jersey, have invented a new and useful Repeating Mechanism for Watches or other Time-Pieces, of which the following is a specification.

My invention relates to the striking or repeating mechanism of that class of repeating and striking watches wherein the hour is struck by a toothed disk or rack and the divisions of the hour by a separate rack.

The objects of my invention are, first, to separate from the time mechanism those parts of the repeating mechanism which have heretofore been placed within the time-movement and place the same, with the other parts of the repeating mechanism, outside of the time mechanism, and this part of the invention consists in placing the said parts—viz., the spring-barrel, gearing, hammers, and bell-wires—on the exterior surface of the time-movement and arranging the other parts of the striking mechanism to connect therewith; second, to construct the repeating mechanism in which the hour and its divisions are struck by separate racks as a separate and distinct attachment for watch-movements and adapt the same to be connected with the movement, and this part of the invention consists in placing all the parts of the repeating mechanism on one plate, which may be either the watch plate or bridges or a separate plate, and arranging the said mechanism so that the various parts connect with each other and with the time-train without interfering with the regulating parts of the time mechanism; third, to construct repeating mechanism in which the hour and its divisions are struck by separate racks, so that it can be manufactured as a separate attachment ready for connecting with a watch-movement, and this part of the invention consists in connecting the several parts of the repeating mechanism with a plate and bridge, which said plate and bridge are fastened together and adapted to be applied to the watch-movement; fourth, to arrange the repeating mechanism so that the bell-wires can be placed above the movement and between the said mechanism and the periphery of the repeater-plate or watch-plate, and this part of the invention consists in arranging the snails, vibrating snail-pieces, racks, regulating-wheels, hammers, and springs around the center post of the watch, so as to leave space between the repeating mechanism and the periphery of the repeater-plate or watch-plate for the bells; fifth, in repeating-watches wherein the hours and the divisions of the hour are struck by separate racks to provide space for the bells around the surface of the back of the watch-movement, and this part of the invention consists in arranging the entire repeating mechanism above or over the time-movement, so as to leave a space between the said mechanism and the periphery of the watch-plate for the reception and vibration of the said bells; sixth, to simplify the assembling and adjusting of the repeating mechanism, and this part of the invention consists in providing the snail-pieces with adjusting devices by which they can be quickly and easily adjusted to operate accurately in connection with the striking-racks; seventh, to increase the volumn of sound from the bell-wires, and this part of the invention consists in clamping the bell-wires and the watch-movement firmly together and to the case; eighth, to connect the sliding bolt for operating the repeating mechanism with the said mechanism above the center rim of the watch-case, and this part of the invention consists in connecting the slide with the lever of the repeating mechanism through the bezel or snaps instead of through the center; ninth, to connect the sliding bolt directly with the repeating mechanism, so as to form part thereof instead of part of the case, and this part of the invention consists in connecting the sliding bolt directly with the lever which operates the repeating mechanism; tenth, to provide a sliding bolt for operating the setting-lever of repeating mechanism arranged to form a dust-tight connection with the case, and this part of the invention consists in forming the sliding bolt with an adjustable spring, so that it covers the slot through which the lever connects with the bolt; eleventh, to provide an improved hammer for striking time-pieces, and this consists of a hammer in which a single spring is arranged to control the click and, in connection with a pin on the plate, to throw the hammer back after making a stroke.

In the accompanying drawings, Sheet I, Figure 1 represents the back of a watch-movement with my improved repeating mechanism attached thereto; Fig. $1^a$, the repeater-plate with part of the repeating mechanism removed; Fig. $1^b$ the under side, and Fig. $1^c$ the upper side, of the repeater-bridge; Fig. $1^d$, a section of the repeater-plate, taken on line $x\,x$ of Fig. $1^a$. Figs. $1^e$ to $1^j$ are views in detail of the several parts of the repeating mechanism. Sheet II: Fig. 2 represents a repeating attachment applied to a three-quarter-plate watch-movement, and showing also a modification of the hour-piece, the setting-lever, winding-segment, and releasing device; Fig. 3, the repeater-plate with the bridge or upper plate removed and detached from the watch-movement, also showing the position of the disk or hour rack before being revolved by the movement of the lever, also showing the position of the hour-piece and the winding-segment, lever, and releasing device. Fig. 4 represents the repeating attachment separated from the watch-movement, and showing the minute-striking rack H′, released by the movement of the lever pressing the hour-piece against the hour-snail. This figure also shows the position of the shoulder 4 of the minute-striking rack with relation to the hammer-click, which is released and set in position by its spring to engage the teeth of the disk or hour rack. Fig. 5 is a sectional edge elevation of Fig. 4, illustrating the position of the rack-piece H′ and the releasing spring and pin when the rack-piece is not in contact with the snail Z′—in other words, before the rack-piece is released; Fig. 6, a similar view illustrating the position of the rack-piece and releasing spring and pin when the rack-piece has been released and is in contact with its snail; Fig. 7, a detail view of the winding-segment with its pin engaging the slot in the hour-piece, and illustrating the manner of operating the pin of the releasing device. Fig. $7^a$ represents a top and an edge view of the winding-segment, and showing the pin by which it engages the slot in the hour-piece. Fig. $7^b$ represents the hour-piece with the slot and releasing device. It also shows an arm in dotted lines by which the hour-piece may be pivoted to the plate. Fig. 8 shows a clamping-plate for fastening the bell-wires to the plate. Sheet III: Fig. 9 represents a watch-movement with the repeating mechanism applied to the back plate of the watch, showing also another form of bridge, a different arrangement of the repeating mechanism, and the sliding-bolt attachment for setting the repeating mechanism. Fig. $9^a$ represents the under plate or bridge, and Fig. $9^b$ the upper plate or bridge. Fig. $9^c$ shows details of the setting and winding mechanism, Fig. 9. Fig. 10 represents an arrangement of the repeating mechanism applied to a full-plate watch. Fig. $10^a$ shows a barrel-bridge arranged for receiving the repeating mechanism. Fig. $10^b$ represents the bridge. Fig. $10^c$ represents detailed views of the sliding bolt illustrated in Fig. 10.

Referring to the drawings, Sheet I, the center post and wheel of a watch-movement are indicated by the letter A, the other parts of the movement being omitted. B is the repeater-plate, and C the repeater-bridge, which carry the various parts of the repeater mechanism. Plate B is about the same diameter as the plate of the time-movement, and is placed directly on the latter plate and fastened to the time-movement by two or more of the screws which hold the movement together, screw-holes being made in the plate B at points corresponding to the screw-holes and posts of the full-plate movements. Plate B has an irregularly-cut opening $a$, which admits those parts of the movement which project through or above the back plate. This opening is of such a shape that the plate can be applied to different styles of watch-movements—say full, half, or three-quarter plate. Any portion of the said movement that projects through or above the back plate passes into the said opening and shows through the same, while the plate B, by reason of this opening, fits down on the back plate around the said parts. The segmental repeater-bridge C is of less radius than plate B, on which it is placed and secured by suitable screws. This bridge has its surface cut out, forming an irregular opening $a'$ of the same or similar shape as the opening in that part of the plate B over which the said bridge is placed, so that the edges of the openings $a\ a'$ may coincide. Between plate B and bridge C are placed all the wheels and snails of the repeating mechanism, suitable seats being turned out for the same and holes provided for the staffs, pivots, &c. In plate B is a hole $b$ for the reception of the barrel D, in which is the spring that operates the toothed hour-disk or hour-rack $f$. The hole $b$ is counterbored in its under side (see Fig. $1^d$) for the reception of the flange of the barrel D, which is engaged by the screws that fasten the barrel in place. The said flange is provided with notches, in order that one of the screws may engage one of the said notches to hold the barrel when it is turned to adjust the power of the mainspring. The spring in the barrel engages an arbor which carries a pinion $d$, ratchet-wheel $e$, and toothed disk $f$. On the upper side of the disk $f$ is a pin $g$, and on the arbor above the disk is placed loosely a finger $h$ for moving the rack which strikes the divisions of the hour. This finger lies on top of the disk, and its free end is provided with a pin $h'$, or in place thereof its end may be turned up at right angles to form a pin, both forms being shown in Fig. $1^i$. The arbor carries a toothed wheel $i$, that engages the regulating-wheels E in the usual manner common to all repeaters, and the arbor also connects with the spring in the barrel D. F is the lever which connects with the sliding bolt outside the case and sets the repeating mechanism. This lever is pivoted between the plate and bridge (see Fig. 1[a]) and has two operating ends $j$ $j'$, the former operating the winding-segment and the latter the hour-piece. G is the winding-segment, (shown separately in Fig. 1[h],) placed over the lever on the same pivot, its teeth engaging the pinion $d$. The segment has a pin $k$, which projects downward against or in line with the lower edge of the lever. The lever carries a pin $k'$ just above the edge of the winding-segment. When the lever is turned to the right, the pin $k'$ bearing against the edge of the winding-segment and pin $k$ bearing against the edge of the lever, the lever, by means of said pins, turns the winding-segment, and thereby the winding-segment is caused to wind up the spring in the barrel D. By this means the spring is wound sufficiently to turn the disk back and strike the hours, and also cause the finger $h$ to force back the rack which strikes the divisions of the hour. The end $j'$ of the lever operates the hour-piece and also releases the minute-piece to set the minutes. H is the hour-piece pivoted at 1 between the plate and bridge. The shorter arm $l$ is the snail-piece, while the longer arm $l'$ is curved and extends downward between the periphery of the plate and the opening $a$, and its end lies over the end $j'$ of the lever. On the under side of arm $l'$ is a stop $m$ in such a position that when the lever is pushed around the end $j'$ strikes the stop. The side of the stop next to the lever has a beveled notch or face, as shown, and when the edge of the lever is pressed against it it will have a tendency to press the arm $l'$ down as soon as it meets resistance from the hour-piece coming in contact with its snail Z, and thereby being prevented from moving farther sidewise on its pivot. Above the lever is a flat spring I, having one end fastened near the periphery of the plate and its opposite free end provided with a pin $n$, projecting upward through a hole $n'$ in the bridge C. Against the pin an arm $n''$ of the piece H′ bears and holds the said piece back. The piece H′ is pivoted at 2 to bridge C, and at one end has an arm or snail piece, which is carried in contact with the snail Z′, and at the opposite end a rack in position to engage the click on the hammer which strikes the divisions of the hour. The piece H′ is held by the pin $n$, bearing against the end of the arm $n''$, and when released from the said pin a rack-spring $p$ throws it forward against the snail. The operation of this device is as follows: When the lever is turned to wind up the spring in the barrel, its end $j'$ is carried against the stop $m$ and moves the hour-piece until it is stopped by its snail. The resistance it then meets with causes it to press the hour-piece down, (by riding up the beveled surface of the stop,) and the arm $l'$, bearing on the spring I, bends its free end downward and thus withdraws the pin $n$ out of the way of the arm $n''$ of piece H′. Thereupon the rack-spring throws the piece forward until it is stopped by its snail Z′ and the rack on the opposite end is carried past the click on the hammer, the number of teeth passing the click depending on the distance the snail allowed the piece to move. Thus the hour-piece is set by the direct pressure of the lever, while the piece H′ is released thereby and set by the spring. The end $j'$ moves from its normal position a certain distance before it touches the stop on the hour-piece. In this interval the spring is partly wound up, and the force thus obtained is used to move the rack for striking the divisions of the hour. The toothed disk $f$, it will be observed, has twelve teeth and a portion of its periphery is blank. When the lever first winds the spring, the blank space passes the hour-click; but when the lever touches the stop of the hour-piece the first tooth (counting from the left) is close to the click of the hour-hammer, and when the arm of the hour-piece touches the the longest step of the snail the first tooth will have passed the click, and from that point on an additional tooth is carried past the click as the arm is carried to the successive steps of the snail—that is, when the arm touches the deepest step all the teeth on the rack will have passed the hour-click and the disk is set to strike twelve o'clock. When the disk is turned as above indicated, the pin $g$ is turned away from the finger $h$, (see Fig. 1[i],) and when the piece H′ is released the pin on said finger $h$ is struck by the shoulder 3, formed on piece H′, and thereby the finger is turned or thrown around to the left, the distance it is moved depending upon the distance the piece H′ is permitted to move by the snail. This movement is so adjusted that if one of the divisions of the hour has passed, (say five minutes,) and consequently one tooth of the rack is carried past the click, the finger is carried to such a point that on the return it will move the piece back, so that one tooth will be caused to engage the click and operate the hammer. The rack shown in Fig. 1 is arranged for striking divisions of five minutes, there being eleven teeth, and each step of the snail, except the longest step, represents an interval of five minutes, the first or longest step being opposite the piece H′ on the full hour to prevent the first tooth from passing the click, as there is no division of the hour to be struck. To cause the finger to move the piece H′ back so that the teeth on the rack will engage the click and strike the divisions of the hour, the pin $g$ is adjusted so that after the hours are struck by the return revolution of the disk, the pin $g$, after an interval, comes in contact with the finger, and this pin forces the finger around, and in turn the pin $h'$ on the finger, bearing against the shoulder 3, forces the piece H′ back, and its rack engaging the click of the hammer the divisions of the hour are struck. When all the teeth on the rack have passed the click, the pin $g$, after the hours are struck, immediately touches the finger $h$ and moves it back; but if no teeth have passed (when it is an even hour) the pin does not touch the finger until the disk has nearly stopped its motion, and then it moves the finger only enough to move the arm of piece H′ back of the pin $n$ of the releasing-spring I. To prevent erroneous striking of the time by a failure to push the lever the full distance, a device is used which will now be described. (See Sheet I, Figs. 1 and $1^c$, and Sheet II, Figs. 2, 3, and 4.) On the tail $p'$ of the hour-hammer click is fixed a pin $q$, which projects up in line with the edge of piece H′, (see Sheet II, Figs. 5 and 6; also shown in Fig. 2,) in which at the angle formed by the extension of the rack is an incut forming a shoulder 4, which lies directly over the click, (see Sheet II, Fig. 2,) so that when the piece is back in its normal position the shoulder 4 bears against the pin $q$, and, pressing against the same, turns the click aside out of the path of the teeth of disk $f$, so that no matter how much the said disk turns the teeth will not engage the click and the hammer will not be operated; but when the piece H′ is released and the rack-spring sets it, the click being released by the shoulder 4 moving away from the pin $q$, the click-spring 16 throws it into position to engage the teeth of disk $f$. (See Sheet II, Fig. 4.) As before described, piece H′ is not released until lever F is turned far enough to press the hour-piece against the snail. Consequently, if by inadvertence or accident the lever is not moved far enough to set the hour-piece against the snail and release the piece H′, the click will not be released and the disk is turned around to its normal position without operating the hammer. Thus it will be impossible to strike the time wrong, and when once the repeating mechanism is set by moving the lever the right distance and releasing the piece H′ the time must be struck by the mechanism resetting itself under the pressure of the spring.

Sheet II: The lever is shown in connection with the toothed segment and hour-piece on a three-quarter plate. The winding-segment has an arm L, provided with a downwardly-projecting pin $t'$. The hour-piece H (see Fig. 3) is a segment of a circle, and it rests in a position nearly approximating to the periphery of the plate. It has a curved arm or extension, as shown, by which it is pivoted to the plate at 1, Figs. 3 and 4. The said piece is provided with a slot $t''$, Fig. $7^b$, into which the pin $t'$ on the winding-segment, Fig. $7^a$, projects and moves. To the under side of the hour-piece is fastened a releasing-spring I. (See Fig. $7^b$, Sheet II.) This spring is also shown in Figs. 2, 3, and 4, and in detail in Figs. 5, 6, and 7 on Sheet II. The free end of said spring rests over one end of the slot $t''$, so that when the lever moves the toothed segment the pin $t'$ pushes the hour-piece until its snail end presses against one of the steps of the hour-snail, its further movement being stopped by the said snail. The continued pressure of the lever causes the pin $t'$ to bend the spring I down, whereupon a pin $n$, that projects upward from said spring into a hole in the hour-piece and through a coincident opening in the bridge C, adjacent to and in juxtaposition with the inner edge of the rack-piece H′, is drawn downward by the bending of the spring below the surface of plate C. The said pin $n$ holds the rack-piece H′ against the pressure of its spring. Consequently when withdrawn it releases said piece, whereupon its spring causes it to fly until its snail end comes in contact with its snail or one of the steps thereof. Thereupon the rack on its opposite end is carried past the click of the minute-striking hammer, or so many of the teeth of said rack as there are minutes or five minutes in the hour. (See Figs. 4 and 6.) The rack-piece H′ being in this case arranged for striking five minutes, it will be understood that each tooth of the rack represents an interval of five minutes, and when the piece is set by the snail, or by its snail end coming in contact with one of the steps of the snail, it is set for striking the number of five minutes there are in the hour less than the total number.

Sheet III: On this sheet are shown several modes of applying the repeating mechanism so as to further reduce the space occupied by the same, also showing the mainspring applied over or above the back plate of the movement. The bridge B, it will be observed, is a small flat irregularly-shaped plate placed between the center post and edge of the movement, so as to leave ample space for the bells within the periphery of the movement. The repeating mechanism (shown in Figs. 9, $9^a$, and $9^b$) is of ordinary character, and its mode of operation is well known. The novel features consist in placing all the mechanism outside of and on one surface of the watch-movement and in the manner of connecting the lever with the sliding bolt outside of the case. Heretofore in repeaters of this class the various parts of the repeating mechanism were separated and distributed about the watch-movement, the spring-barrel and regulating-gearing, hammers, and bell-wires being placed between the front and back plates of the movement or within the time mechanism. The releasing-spring, lever, winding-segment, the link, rack, hammer-clicks, hour-disk, and the snails were placed on the front plate of the movement, the releasing-spring lying directly in line with the periphery of the front plate. In the present invention these parts are all grouped together on one surface of the watch-movement, and have only a gearing connection with the time mechanism. The spring-barrel D as a separate attachment is dispensed with and a seat D′ is turned in the plate for the spring, and the gearing E, Fig. 9, is arranged and connected with the spring in the usual manner and between the plate and the bridge C, as described and shown in connection with other figures of the drawings, and the rack-piece H′, by which the divisions of the hour are set and struck, and the rack-spring are placed above the bridge, and the rack-piece, which moves toward the snail Z′, has a pin *r*, projecting downward into a slot *r*′, in which it moves, said slot being made in the bridge, and extends to the deepest step of the snail Z′. The rack-releasing spring, the lever and hour-piece, the winding-segment and its link, which presses against the releasing spring, are all constructed in the usual way; but the arrangement of the several parts of the mechanism is different. The releasing-spring I is placed nearer to the center of the watch-movement. By this and other rearranging of parts, which is clearly illustrated, the repeating mechanism is grouped in a small space nearer to the center of the movement, and thereby an annular space J is left between the repeating mechanism and the periphery of the movement for the bells. Another departure from the usual construction of the repeater consists in dispensing with the spring-barrel as a separate device and providing a place for the spring in the bridge by turning out a seat D′ and in placing the snails between the center-post and the periphery of the movement instead of at the center of the movement, as heretofore.

Fig. 10: This figure represents the repeating mechanism arranged in a different manner from that last described. The snails, gearing, spring-barrel, racks, and hammers occupy different positions on the surface of the movement. The mechanism is also shown as applied directly to the barrel-bridge forming part of the movement-plate of a full-plate Waltham watch; but it can be arranged in the same manner on other full-plate movements and also on three-quarter plate movements. The snails may be connected on the three-quarter plate movements in the same way as shown in other figures or in any suitable manner. In this figure the snail is moved by a pinion placed on the staff, which is connected through the movement by suitable gearing with the cannon-pinion. The star-wheel and hour-snail Z are pivoted in the lower plate and bridge, and the upper end of their staff is held and turns in a slot *t* in the upper bridge. The escapement-spring K presses against the star-wheel, and thereby holds the end of the staff in the slot at one end of the slot, but at the same time permits it to move lengthwise of the slot when pressed with sufficient force. The hour-piece H when moved against the hour-snail Z presses against the snail and moves the staff lengthwise of the slot, and when the hour-piece is set the pressure of the escapement-spring forces the staff back to its normal position. The object of this construction is to release the rack-piece H′, the end of the curved arm of which bears against the end of the staff which projects above the slot.

Fig. 10ᵃ shows the barrel-bridge forming part of the movement-plate arranged to receive the repeating mechanism with the gearing, hammers, snails, and springs removed, and Fig. 10ᵇ shows the bridge with the rack-piece and spring attached.

The sliding bolt by which the repeating mechanism is operated or set from the outside of the case is illustrated on Sheet III. Figs. 9 and 10 show different methods of connecting the outside bolt with the lever. In Fig. 9, M is the center of a watch-case, M′ is the cap-snap, and M″ is the back-snap. In the cap-snap is made a cut or slot to admit the lever F flush with the snap and long enough to allow the lever to move the proper distance to set the repeating mechanism. N is an inside slide of thin metal, which is placed on the surface of the center M, with its concave edge, which has the same curvature as the case, against the back snap M″. This slide is held in place by two screw-heads *u u*, under which it slides freely back and forth, its movement being limited by a projection *u*′ of its convex edge, which projects outward beyond the periphery of the center, where it is connected with the outside slide N′, which lies closely against the periphery of the center and is provided with a thumb-catch. On the inside slide is a stud *u*″, which rests against the edge of the lever. By pushing the slides in the direction of the arrow the stud bearing against the lever moves it to set the repeater mechanism, while the lever is returned to its normal position by its spring in the ordinary manner. It will be observed that the connection between the slides and the lever is made without cutting into the center, the inside slide being placed between the edge of the outside or back of the case and the center, a suitable slot being made in the said edge for the movement of the lever. In Figs. 10 and 10ᶜ is shown a modification of the slide. In this the inside slide is dispensed with and the lever is carried through a slot in the edge of the cover and into a mortise or slot in the outside slide N′, and its end projecting through the said slot is provided with a transverse hole, (indicated by dotted lines in Fig. 10.) A spring *v*, which is laid in a channel *v*′ in the edge of the slide, has one end passed through the hole in the lever and the opposite end, which is reduced to form a pin *v*″, passed through the bent end of a plate O, which is laid over the channel and spring to cover and conceal the same and has its opposite end secured to the slide by a screw. The end of said plate which is secured to the slide projects above the surface of the slide and forms a thumb-catch. By this construction the sliding bolt N′ is fastened to the lever by the spring *v*, which holds it firmly and tightly against and over the joint between the case and center and over the slot through which and in which the lever moves. The spring attachment at the same time allows the slide to move back when the case is opened and closed, and thus forms a perfectly dust-tight cover for the opening in the case without interfering with the opening and closing of the same.

The adjusting devices for the snail-pieces are shown in detail on Sheet I. Three several devices are shown under Fig. $1^g$. One consists of a set-screw 7, passed into the snail-piece, so that its head will be carried against the steps of the snail. Another shows a screw 8 passed entirely through the snail-piece, so that its point will be carried against the snail, and the third consists in making the snail-piece proper separate and pivoting it to the lever, and then regulating it by means of an oval or half-headed screw 9. By these arrangements the assembling and adjusting of the repeating mechanism are greatly facilitated, for if any error occurs in making the mechanism or the plates whereby the hour, minute, or quarter pieces would be prevented from touching the snails at the right moment the pieces can be adjusted instantly without taking the mechanism apart and without filing or cutting the pieces.

The improved bell-wires are shown in Sheet I and Sheet II, Figs. 2, 4, and 6. The mode of manufacturing these wires consists in making them of the proper shape to go into the watch, and in one piece Y′ with the plate by which they are attached, from a sheet or plate of suitable metal.

Fig. 8, Sheet II, represents the clamping-plate of a bell-wire, which may be used also to clamp the bell-wires tightly to the case. The downwardly-turned flange 15 is intended to bear against the inside periphery of the watch-case, so as to connect the fixed ends of the bell-wires with the case, and thereby give a solidity to their attachment, which will greatly increase their sonorousness and the clearness of the sound.

On Sheet II, Figs. 2 and 4 show the screw-plates of the bell-wires extended beyond the periphery of the repeater-plate, so as to bear against the case and produce the same effect of increasing the volume and clearness of the sound. Fig. 3 shows the repeater-plate with the projection $q'$ arranged so as to bear against the case as well as the clamp.

The hammers Y shown in the various figures are of novel construction. They are struck out from sheet metal. Through their heads is drilled a hole in which one end of the click-spring 16 is inserted, as represented by the dotted lines, the opposite end being placed against the tail of the click. The click-spring is made from a piece of hair-spring and its end is secured in the hole in the hammer-head by a pin. In connection with the click-spring just described a stud 17, inserted in the plate, is used and has the following function in connection with the said spring: When the hammer strikes the bell-wire, the click-spring comes in contact with the said stud, which, reacting on the spring, throws the hammer back quickly out of contact with the bell-wire.

All of the steel pieces and brass plates described and shown herein are of such shape that they can be struck out from sheet metal by suitable dies.

The spring-barrel D, Fig. $1^d$, can be easily detached from the repeating plate or bridge without disturbing other parts of the repeating mechanism. This is a great advantage, as in case the mainspring breaks the barrel can be removed and a new spring inserted in a short time and at a slight expense.

I claim—

1. In repeating-watches, a repeating mechanism placed on one surface of the time-movement, having separately-operated racks engaging the hammers to strike the hour and its divisions and driven by a special spring, in combination with the snails driven by the mainspring of the time-movement, substantially as described.

2. A repeating mechanism placed on the back of the watch-movement and operated by a setting-lever and having separately-operated racks for the hour and its divisions and driven by a special motor-spring, in combination with a snail or snails in connection with and driven by the mainspring of the time-movement, substantially as described.

3. A repeating attachment having separately-operated racks for the hour and its divisions, in combination with a starting device connected with the plate of the repeating attachment for releasing the rack or racks, substantially as described.

4. In combination with a watch-movement, a plate and bridge, and a repeating mechanism having separately-operated racks for the hour and its divisions, a spring for operating the repeating mechanism, and snails and snail-pieces, all of which are connected with said plate and bridge, and the snails being connected by intermediate gearing with the mainspring of the time-movement, substantially as described.

5. In combination with a watch-movement, a repeating mechanism having separately-operated racks for the hour and its divisions assembled about the center of the movement, so as to leave space on the same surface for the bell-wires within the periphery of the movement, and a special spring by which the repeating mechanism is driven, substantially as described.

6. In combination with a watch-movement, the snails, regulating-wheels, hammers, bell-wires, and spring-barrel, snail-pieces, and releasing device for the rack that strikes the divisions of the hour placed on one surface of the movement, substantially as shown and described.

7. The combination, in a repeating mechanism, of the snails, snail-pieces, spring-barrel, and regulating-wheels placed together on the back of the watch-movement, substantially as specified.

8. As a new article of manufacture, a repeating mechanism having separate racks for engaging the hammers for striking the hours and its divisions assembled together ready for placing on the watch-movement, and having a special spring for driving the repeating mechanism, substantially as described.

9. The combination of the plate B, adapted to be connected with a watch-movement, and a bridge C, placed on the said plate and the repeating mechanism herein described, connected with the said plate and bridge, so that when placed on the watch-movement it can be connected with the time mechanism, and having a special spring for driving the repeating mechanism, substantially as described.

10. The plate B, adapted to be connected with a watch-movement and provided with a suitably-placed opening for the spring-barrel, in combination with a spring-barrel connected with said opening, and repeating mechanism driven by the spring in said barrel, substantially as described.

11. The repeater-plate provided with an opening or seat for the mainspring of the repeating mechanism, in combination with a mainspring and repeating mechanism driven thereby and a device for winding the spring, substantially as described.

12. A spring-barrel for repeating mechanism placed above or over the gearing mechanism in a watch-movement, substantially as described and shown.

13. In a repeating-watch, a plate provided with an opening or seat for the mainspring of the repeating mechanism, in combination with a winding device for the spring, all arranged on the back plate or bridge of the watch-movement, substantially as described.

14. In a watch-movement, the back plate or bridge provided with a suitable seat for the motor-spring of a repeating mechanism arranged to be placed on the back of a watch-movement, substantially as described.

15. In combination with a watch-movement, a setting-lever, striking-racks engaging the hammer-clicks, a releasing device for the rack that moves the hammer that strikes the divisions of the hour, snail-pieces, and snails, all arranged and connected above the back of the watch-movement, substantially as specified.

16. In combination with the watch-movement, the hammers, striking-racks engaging the hammer-clicks, snail-pieces, and snails, all arranged and connected above the back of a watch-movement, so as to leave space on the same surface for the bell-wires within the periphery of the movement, substantially as specified.

17. In striking attachments for watches, a spring-barrel separated from the time-movement, in combination with the regulating-gearing and a device for winding up the spring in the barrel placed on one surface of the watch-movement, substantially as described.

18. A repeating mechanism placed between a plate and bridge, in combination with devices for connecting the same with the time-train of a watch-movement and a special spring for driving the repeating mechanism, substantially as described.

19. A repeating mechanism in which the hours and its divisions are struck by separate racks and adapted to be connected with the time-train by the gearing which sets the snail, assembled on the back of the watch-movement so as to leave space on the same surface for the bells, in combination with a special spring for driving the repeating mechanism, substantially as described.

20. The combination, in a repeating-watch, of the hour-rack, finger *h*, and rack-piece H′ with the regulating-gearing arranged on the back of the watch-movement, substantially as described.

21. The combination, in a repeating-watch, of the hour-rack, finger *h*, and rack-piece H′ with the hammers, all arranged on one surface of the watch-movement, substantially as described.

22. The combination of the hour-rack, finger *h*, and rack-piece H′ with the regulating-gearing and hammers arranged above the back of the watch-movement, substantially as described.

23. In a repeating-watch, the hour-rack, finger *h*, and rack-piece H′, in combination with the hammers and bell-wires arranged above the surface of the watch-movement, substantially as described.

24. The combination of the spring-barrel and its arbor, the hour-rack, finger *h*, gearing E, and winding device when placed on one surface of the watch-movement, substantially as described.

25. In repeating mechanism in which the hour and its divisions are struck by separate racks, the combination on one surface of the hour-striking rack, finger *h*, piece H′, bell-wires, hammers, and regulating-gearing, as and for the purpose described.

26. The combination of the hammers, rack-piece H′, hour-rack, and releasing device for the rack that strikes the divisions of the hour when arranged on one surface of the watch-movement, substantially as described.

27. The combination of the snail which regulates the striking of the divisions of the hour, gearing to connect the said snail with the time mechanism, rack-piece H′, releasing-spring I, and hammer, all arranged on one surface of the watch-movement, substantially as specified.

28. The combination of the winding segment and pinion, spring-barrel, and mainspring, barrel-arbor, suitable racks for striking the hour and its divisions, snails and snail-pieces, releasing device for the rack that strikes the divisions of the hour, regulating-gearing, and hammers, all arranged on one surface of the watch-movement and adapted to be connected with the time-train on the same surface, substantially as described.

29. A repeating mechanism in which the striking-racks and the devices for setting the same are assembled on the back of a watch-movement, so as to leave a space on the same surface for the bells, in combination with a separate spring for driving the repeating mechanism, substantially as described.

30. In combination with the hour-rack and its hammer placed above the back of the watch-movement, a device operated by the rack-piece H′ to adjust the hammer-click to avoid engaging the teeth of the rack before being set, substantially as described.

31. The combination of a repeating mechanism placed on the back of the watch-movement with the hour-rack, the hour-hammer, hour-hammer click provided with the pin *q*, and the rack-piece H′, provided with the shoulder 4, substantially as shown and described.

32. In combination with an hour-striking rack and hour-hammer, an hour-piece and hour-snail Z, placed on the back of the movement, and a separate spring for driving the repeating mechanism, substantially as described.

33. In combination with the hour-rack, its arbor and spring-barrel, and hour-piece H, placed on the back of a watch-movement, the releasing-spring I, substantially as described.

34. The hour-piece H and releasing-spring attached directly thereto, in combination with the winding-segment G, provided with an arm L, setting-lever F, and the rack H′, which strikes the divisions of the hour, substantially as described.

35. The repeater-plate B, placed on the back of the watch, so as to leave space between its periphery and the periphery of the watch-movement for the bells, and provided with a projection *q′* for the attachment of the bell-wires, substantially as described.

36. In combination with the watch-movement and the watch-case, the repeater-plate provided with the projection *q′*, for the purpose specified.

37. A bell-wire having its screw-plate so formed and attached to the watch-movement that the said plate stands over the periphery of the watch-movement for the purpose of pressing on the edge of the watch-case when applied thereto, substantially as shown and described.

38. A bell-wire having a screw-plate provided with a projection or flange to press on the periphery of the case, substantially as described.

39. A sliding bolt for operating the lever of a repeating mechanism, adapted to connect with the said lever above the center of the case, substantially as described.

40. In combination with the repeating mechanism and its lever, a slide placed outside of the case and connected with the lever above the center of the case, substantially as described.

41. In combination with the lever F, the inside slide N, and outside slide connected with each other and the lever above the center of the case, substantially as shown and described.

42. The combination, in a repeating-watch, of a lever for actuating a repeating mechanism, a watch-case, a sliding bolt for actuating the lever, and a spring for adjusting the said bolt to the case to form a dust-tight connection, substantially as specified.

43. A slide for operating the repeating mechanism, connected with the case and adapted to engage the lever of the repeating mechanism, said slide being connected with the lever between the cap and the center of the case, substantially as described.

44. A repeating attachment having separately-operated racks for engaging the hammers that strike the hour and its divisions and bell-wires, all of said parts being assembled on a plate applied to a time-movement, in combination with a special spring for driving the repeating mechanism, substantially as described.

45. In combination with the bell-wires of a repeating mechanism, a clamp for clamping the bell-wires to the movement, provided with the flange 15 to connect the wires with the case for the purpose of increasing the volume of sound, substantially as described.

46. A rack-piece provided with a suitable adjusting device for adjusting it to the snail, substantially as described.

47. The hour-piece provided with an adjusting device, in combination with the snail and hour-disk, substantially as described.

48. An hour-striking rack, in combination with an hour-piece provided with an adjusting device, substantially as described.

49. A striking-rack, in combination with a rack-piece provided with an adjusting device and a snail, substantially as described.

50. A slide for setting the repeating mechanism of a watch, placed above the center rim of the case, in combination with the case having a cut or slot through its back cover, substantially as described.

51. A hammer for striking-watches, made from sheet metal and provided with a hole in its head by which to fasten the hair-spring, substantially as described.

52. In a repeating mechanism, the combination, with a striking-hammer and a spring attached thereto, of a stud 17, fixed to the plate against which the spring acts to throw the hammer away from the bell-wire after making a stroke, substantially as specified.

53. The combination of a watch-movement, a repeating mechanism connected therewith, a lever placed on the back of the watch-movement for setting the repeating mechanism to strike the time, said lever arranged to be operated by swinging its arm in a direction approximately parallel to the periphery of the watch, and a sliding bolt for operating the said arm of the lever, substantially as specified.

54. The combination, with a watch-movement and repeating mechanism connected therewith, of an actuating-lever placed on the back of the watch-movement and for setting the repeating mechanism to strike the time, and a suitable spring that operates and returns the said lever to its normal position independently of the motor-spring for the repeater, substantially as specified.

55. The combination, with a watch-movement, of regulating-gearing arranged between a plate and bridge independently of the watch-plates, the said plate and bridge adapted to be connected to the exterior surface of a watch-plate, a motor-spring of a repeating mechanism for driving the said gearing, and an actuating-lever for operating and retracting the motor-spring, substantially as specified.

56. The combination, with an actuating-lever, of a toothed segment that is operated thereby and in engagement with a pinion of an hour-rack, the hour-rack which is turned thereby, and gearing for regulating the speed of the said rack on its return motion, said gearing arranged on the back of a watch-movement, substantially as specified.

57. In a repeating-watch, the combination, with the back plate of a watch, of an actuating-lever for setting a toothed segment, the toothed segment in gear with a pinion of an hour-rack, and the pinion and the hour-rack turned by the movement of the said lever, substantially as specified.

58. The combination, in a repeating-watch, of an actuating-lever, a toothed segment, and a separately-movable hour-piece that operates a releasing device, and the releasing device for unlocking a rack, all arranged above the back of the watch-movement, substantially as specified.

59. In a repeating-watch, the combination, with the back plate of a watch-movement, of an hour-snail and an hour-piece that operates a releasing device, a releasing device for unlocking a rack, a toothed segment, and an actuating-lever for moving the segment and setting the hour-piece against the hour-snail, whereby the said hour-piece operates the releasing device, substantially as specified.

60. In a repeating-watch, the combination, with a striking-rack provided with a projection or shoulder between its rack-teeth and its pivot or center, of a releasing device having a stud or pin *n*, that engages and rests behind the said shoulder of the rack for holding it in the normal position of rest, substantially as specified.

61. The combination, with a striking-rack provided with a projection or shoulder between its center or pivot and its rack-teeth, of a releasing device provided with a stud or pin *n* on its upper side for locking the said rack in the normal position of rest, a spring engaging the rack for setting the same, and an hour-piece that operates the said releasing device for unlocking the rack when the said hour-piece is moved against the hour-snail, substantially as specified.

62. In a repeating-watch, the combination of an hour-rack and a separate rack for the divisions of the hour, hammers, and hammer-springs, hammer-clicks and springs, and the bell-wires arranged and placed above the back of the watch-movement, substantially as specified.

63. The combination, with a watch-case, of a sliding bolt that is movable parallel to the center of the watch-case, and a lever that is operated thereby and attached to the back of a watch-movement, the said lever arranged for actuating a repeating mechanism, substantially as specified.

In testimony that I claim the foregoing as my invention I have hereunto subscribed my name this 29th day of July, 1890.

FRED TERSTEGEN.

In presence of—
FREDK. HAYNES,
WILTON C. DONN.